APPARATUS FOR RECORDING AND REPRODUCING SOUND CONTINUOUSLY FOR A LONG TIME ADAPTED TO BE ATTACHED ON A MAGNETIC SOUND RECORD READING MACHINE

Filed Jan. 28, 1959 4 Sheets-Sheet 1

April 24, 1962 YASUSHI HOSHINO 3,031,533

APPARATUS FOR RECORDING AND REPRODUCING SOUND CONTINUOUSLY FOR A LONG TIME ADAPTED TO BE ATTACHED ON A MAGNETIC SOUND RECORD READING MACHINE

Filed Jan. 28, 1959 4 Sheets-Sheet 2

April 24, 1962 YASUSHI HOSHINO 3,031,533

APPARATUS FOR RECORDING AND REPRODUCING SOUND CONTINUOUSLY FOR A LONG TIME ADAPTED TO BE ATTACHED ON A MAGNETIC SOUND RECORD READING MACHINE

Filed Jan. 28, 1959 4 Sheets-Sheet 3

3,031,533

APPARATUS FOR RECORDING AND REPRODUCING SOUND CONTINUOUSLY FOR A LONG TIME ADAPTED TO BE ATTACHED ON A MAGNETIC SOUND RECORD READING MACHINE

Yasushi Hoshino, 462 1-chome, Tamagawa-Okusawacho, Setagaya-ku, Tokyo, Japan

Filed Jan. 28, 1959, Ser. No. 789,538
Claims priority, application Japan Feb. 1, 1958
5 Claims. (Cl. 179—100.2)

The present invention relates to apparatus for recording and reproducing sound continuously for extended periods and which is particularly adapted to be attached on a magnetic sound record reading machine as disclosed in United States Patent No. 2,924,668.

There are many known apparatus for recording or reproducing sound continuously for extended times, but none can be used on the magnetic sound record reading machine as mentioned above.

The object of this invention is to provide an apparatus which can be easily attached on a magnetic sound record reading machine to make it suitable for recording and reproducing sound continuously for a long time. A detailed explanation will be made with reference to the accompanying drawing in which.

In order to understand the present invention, it is necessary to understand the general construction of a magnetic sound record reading machine on which the apparatus of the present invention is attached. Accordingly a brief explanation of said machine will be presented for the understanding of the present invention.

Figures 1, 2, 3, 4:
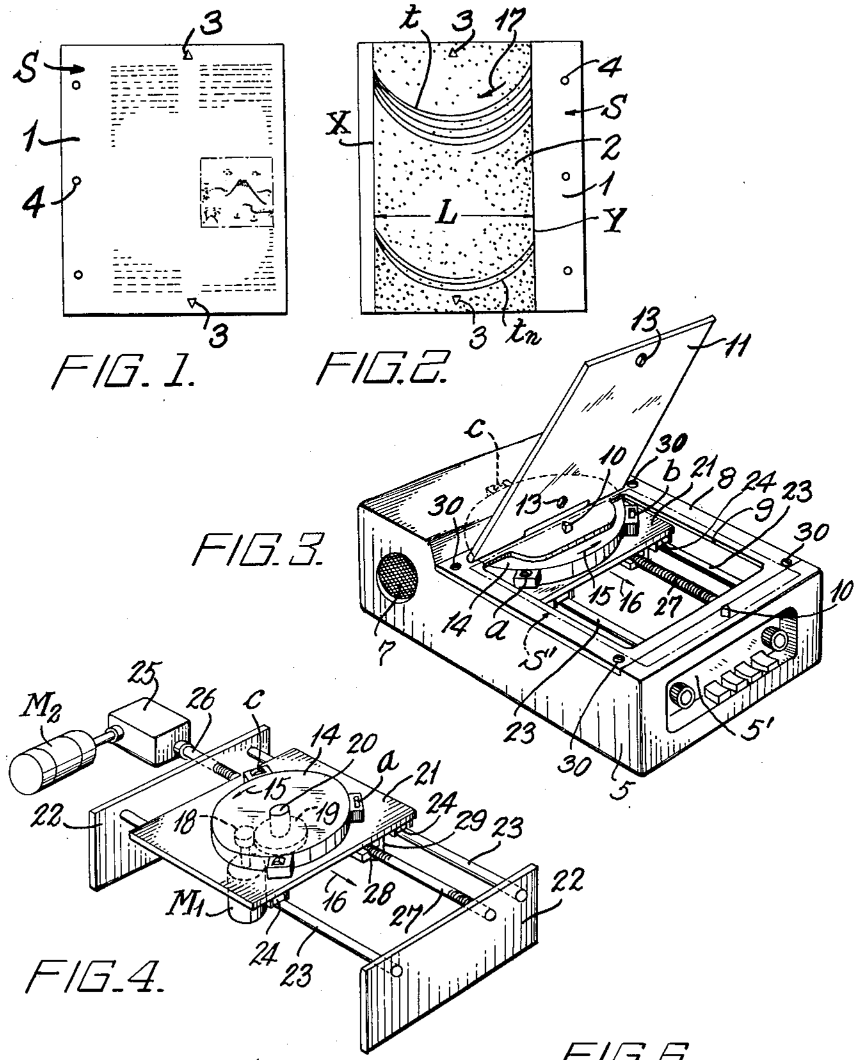
FIGS. 1 and 2 are a front view and a back view respectively of magnetic sound record sheet used on a magnetic sound record reading machine.
FIG. 3 is a perspective view of a magnetic sound record reading machine.
FIG. 4 is a perspective view of a portion of the machine of FIG. 3, illustrating the mechanisms for the rotation and longitudinal shift of the turn table.

The magnetic sound record reading machine has a casing 5 on which a panel plate 8 is fixed by screws 30 as shown in FIG. 3. A turn table 14 provided with a plurality of sound recording and reproducing heads *a*, *b*, *c* (in the illustrated embodiment, 3 heads) is arranged below the panel plate 8 and is rotated by a motor $M_1$ (FIG. 4) through a transmission system 18, 19 while being simultaneously advanced in the longitudinal direction 16 by the same motor $M_1$ through a shiftable table 21 which has a fixed nut member 28 (see FIG. 4) in engagement with a helical screw 27, said nut member 28 being adapted to be rotated by the motor $M_1$ through the shaft 20 of the turn table and a reducing gear (not shown in the drawings). When it is desired to return the turn table 14 to the starting point in the longitudinal direction by a quick motion, another motor $M_2$ is operated to rotate the helical screw 27 through a gear system 25 and a shaft 26 which is integral with the helical screw 27, while the motor $M_1$ is stopped.

A magnetic sound record sheet used on the said machine has visual descriptions on the front surface 1 as shown in FIG. 1 and a magnetic coating film 2 of a determined with L on the back surface as shown in FIG. 2. This sheet can be set on the panel plate 8, with the visual descriptions facing upwardly and the magnetic coating film downwardly.

The panel plate 8 has a window through which the magnetic coating film 2 of the sheet is faced against the heads *a*, *b*, *c* of the turn table, and the sheet is pressed from the top by a transparent plate 11. Accordingly, when the magnetic sound record sheet is set on the panel plate 8 in position by engaging the registration holes 3, 3 of the sheet on the registration pins 10, 10 of the panel plate 8 and the turn table is operated by the motor $M_1$ to rotate and shift, sound reproducing may be performed while the operator reads or observes the description of the front surface of the sheet which is stationary and visible through the transparent pressure plate 11. This is the fundamental principle of the magnetic sound record reading machine. According to this machine, both visual and auditory senses are used to increase the understanding or enjoyment of the sheet. For example, the sounds of a fire brigade, houses falling down, and cries of fleeing people can accompany the photograph of a fire to give greater emphasis thereto. The effect is somewhat like a newspaper provided with audible news which is far more effective than the usual newspapers or radio news.

However, the aforenoted magnetic sound record reading machine has one disadvantage in that the magnetic sound record sheet, being of a size like a sheet of letter writing paper, is limited in its area and consequently the period of continuous operation at one time is limited to a relatively short time, for example, from about 10 to 15 minutes.

The object of the present invention is to eliminate this disadvantage by providing an apparatus which can be easily attached to the magnetic sound record reading machine in replacement of a part of said machine and thereby making the machine usable for a long continuous sound recording and reproducing.

According to this invention, a long magnetic sound record film wound on a feeding roller 31 and a winding roller 32 is used in place of a sheet of limited length as shown in FIGS. 1 and 2. For this purpose, the usual panel plate 8 of FIG. 3 is removed by removing screws 30 and instead a panel plate 8' having the apparatus for long continuous recording and reproducing mounted thereon is fixed on the casing 5 of the machine by screws 30 as shown in FIG. 5.

Figures 5, 8:
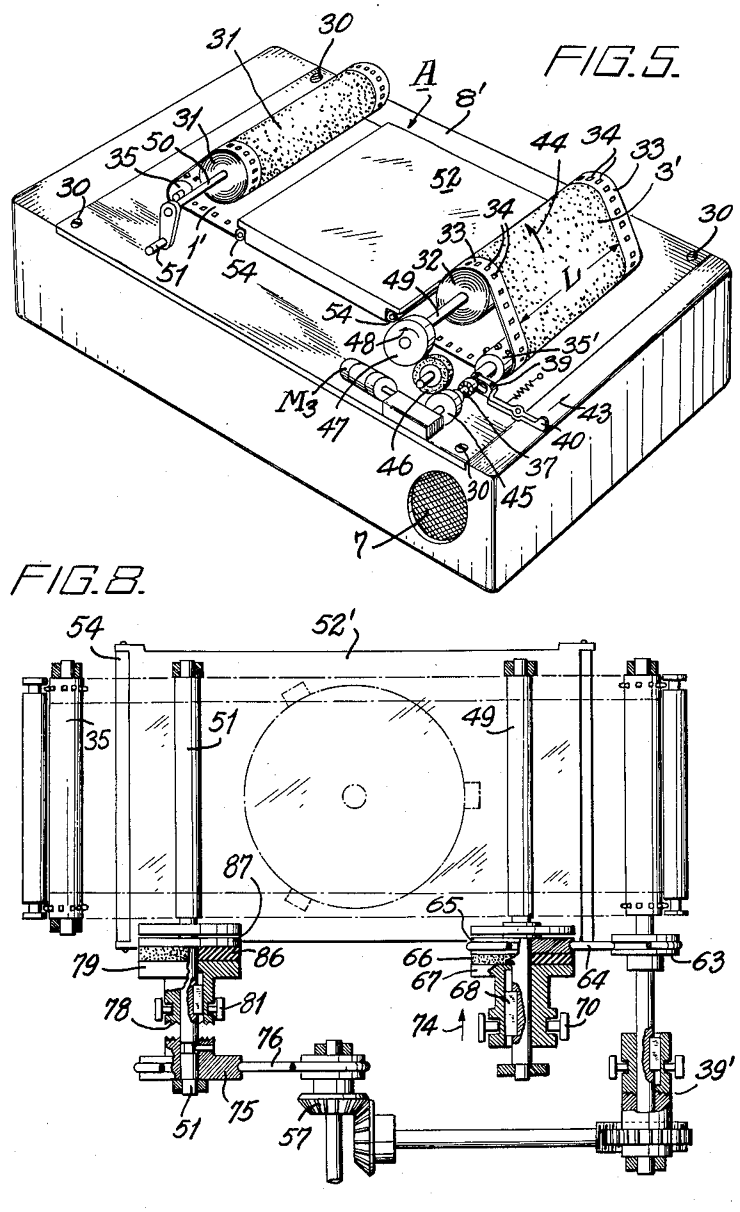
FIG. 5 is a perspective view of the machine with the apparatus of the present invention attached thereto.
FIG. 8 is a top view of the apparatus of FIG. 7.

In FIG. 5, 31 represents a feed roller on which a continuous length of magnetic sound record film is wound, and 32 is a take up roller. The film is made of paper 1' having magnetic coating film 3' of the width L on one surface, leaving margins 33 on opposite sides, in which perforations 34 are formed as shown in FIG. 5. Along and near the feed roller 31 and the take-up roller 32 are arranged sprocket wheels 35 and 35' respectively.

A motor $M_3$ is mounted on the panel plate 8' and drives a shaft 37 through a reducing gear. A clutch 39 is provided between the shaft 37 and the sprocket wheel 35' so that the driving of the sprocket wheel 35' may be interrupted by the clutch 39 which is normally in engagement but may be disengaged by operating a lever 40 in the direction of arrow 43.

On the shaft 37 is fixed a wheel 45 which drives through a rubber idler 46 a wheel 47 integrally fixed on a shaft 49 of the takeup roller 32 in the direction of arrow 48. Accordingly, when the motor $M_3$ is operated, the sprocket wheel 35′ and the take up roller 32 are rotated to wind the film from the feed roller 31 on the take up roller 32.

In the embodiment, a separate motor $M_3$ is used, but this motor may be omitted by making an arrangement to use either the motor $M_1$ or $M_2$ in place of the motor $M_3$.

Now the mechanism for the operation of the feed roller 31 will be explained. The feed roller 31 is fixed on a shaft 50 provided with a fixed handle 51. The film extended from the feed roller 31 to the take up roller 32 is pressed by a pressure plate 52 which may be transparent or opaque.

Figure 6:
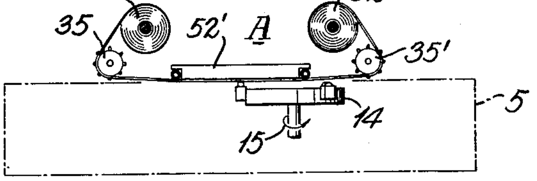
FIG. 6 is a diagrammatic front view of the machine of FIG. 5.

The fundamental principle of the apparatus is that a turn table 14 provided with sound recording and reproducing heads is rotated in the direction of arrow 15 as shown in FIG. 6 but carriage 21 is kept stationary in the longitudinal direction, while the film is wound on the take up roller 32 by rotating the sprocket 35′ so that the film is advanced from the feed roller 31 to the take up roller 32 in the direction of arrow 44. According to this arrangement, a very long film can be continuously recorded and reproduced for as much as one hundred hours. In this operation, the sprockets 35 and 35′ act to prevent the lateral deviation of the film toward either side. It is desirable to make the surface of the pressure plate 52 which is brought in contact with the record sheet elastic by covering said surface with elastic material such as rubber or soft plastics or the like to provide a cushion action to improve the contact between the magnetic sound record film and the head. This has the effect of greatly improving the reproduction of the sound. It is advisable to provide small rollers 54, 54 at the opposite ends of the pressure plate 52 to facilitate smooth transportation of the sound record film between the feed roller 31 and the take up roller 32.

After completion of the sound recording or sound reproducing operation, it is necessary to rewind the film on the feed roller 31. For this operation, the clutch 39 is disconnected by operating the lever 40 so that the sprocket wheel 35′ may be rotated freely and the feed roller 31 is rotated in opposite direction by rotation of the handle 51.

Figures 7, 9:
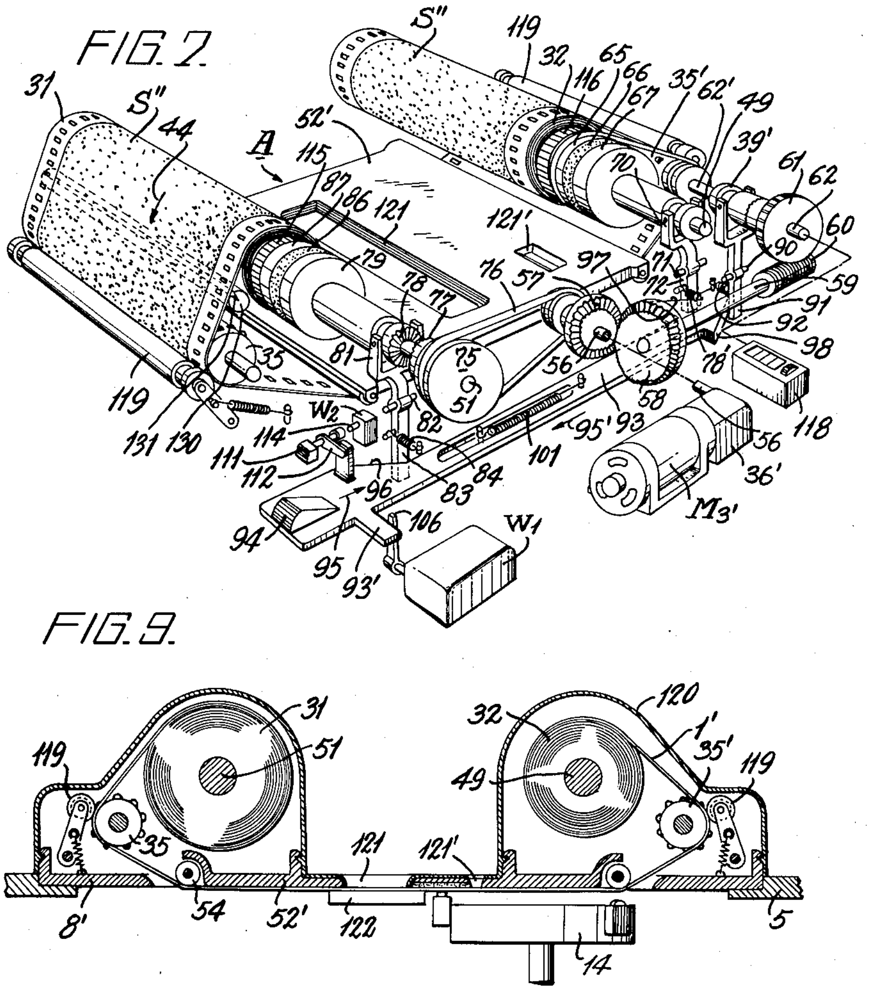
FIG. 7 is a perspective view illustrating one of the embodiments of the present invention mounted on a magnetic sound record reading machine.
FIG. 9 is a longitudinal sectional view of the apparatus of FIG. 7.

For preforming the operations as described above smoothly and satisfactorily, it is preferable to provide further special means. FIGS. 7, 8 and 9, illustrate an embodiment having such means.

The feed roller 31, the take up roller 32, the sprocket wheels 35, 35′, and the pressure plate 52′ are all mounted on the panel plate 8′ (see FIG. 9). At the time of sound recording, the speed of rotation of the motor $M_3'$ (see FIG. 7) is reduced by a reducing gear box 36′ and then transmitted to a shaft 56 to rotate a gear 57 integrally fixed on said shaft at a low speed. Gear 57 drives a gear wheel 58 which is in engagement with said gear 57. The rotation of the gear 58 rotates shaft 59 and worm 60 fixed on said shaft. Worm 60 drives worm wheel 61 which rotates a shaft 62 of the wheel 61.

Between said shaft 62 and the shaft 62′ of a sprocket wheel 35′ is a clutch 39′ which is normally engaged but is disengageable by the operation of a lever 91. Thus when the motor $M_3'$ is operated, the sprocket wheel 35′ is rotated to advance the film S″ from the feed roller 31 to the take-up roller 32 in the direction of arrow 44. As seen in FIG. 8, the shaft 49 of the take up roller 32 has a wheel 65 rotatably mounted thereon, and a rubber belt 64 is engaged with a wheel 63 on the shaft 62′ and the wheel 65. The wheel 65 is freely rotatable on the shaft 49 but is in engagement with a pressure disc 67 through a frictional ring member 66 made of a material such as felt or rubber. The pressure disc 67 is slidable on the shaft 49 but is fixed by a key 68 against rotation and is normally pressed strongly against the wheel 65 by means of a lever 72 (see FIG. 7) pivoted at 71 and having an end finger 70 and a spring 78′. Accordingly, the rotation of the wheel 65 is normally transmitted to the takeup roller 32 through a friction coupling formed by the wheel 65, the ring member 66 and the pressure disc 67 which avoids the application of excessive tension to the film during the winding operation.

During the above mentioned operation, the clutch 77—78 of the shaft of the feeding roller 31 is disengaged as shown in FIG. 7 and hence the feeding roller can freely rotate independently of wheel 75 which is rotatably mounted on the shaft 51 of the feeding roller 31 and which is adapted for rotation by the motor $M_3'$ through the reducing gear 36′ the shaft 56, and a belt 76 which is hung around said wheel 75. On the other hand, when it is desired to rewind a film from the take up roller 32 to the feed roller, the rewinding is conducted by engaging in driving relation the feed roller 31 and the wheel 75 which is rotated by the motor $M_3'$ in a direction reverse of that in the winding direction. For this purpose, the wheel 75 has a clutch gear 77 which is normally disengaged from a clutch gear 78 which is integrally fixed on a wheel 79 and which is slidably mounted on the shaft 51 of the feeding roller 31 but is not rotatable around the shaft.

For control of the position of the wheel 79 and consequently the clutch 78, a lever 83 pivoted at 82 and having an end finger 81 in engagement with the wheel 79 is provided and this lever is normally pulled by a spring 84 to urge the wheel 79 away from the wheel 75. On the side of the wheel 79 is a ring member 86 made of a material such as felt or rubber, and further a metallic ring member 87 which is fixed on the panel plate 8′ or a pressure plate (not shown). Accordingly, when the shaft 51 is in the position shown in FIG. 8, there is some frictional resitance against the rotation of the shaft because of the presence of the fixed ring member 87, the ring of felt or rubber 86 and the wheel 79 which is not rotatable in relation to the shaft 51 and which is in contact with the fixed ring 87 through the ring 86. This friction is useful for maintaining the film S″ in stretched condition when it is being wound on the take up roller 32 for the reproduction of sound.

When the film S″ is rewound on the feed roller 31 from the takeup roller 32, the clutch 77—78 on the shaft is engaged by shifting the wheel 79 towards wheel 75 by means of the lever 83 (FIG. 7) which controls the position of the wheel 79 and consequently the clutch 78. When the wheel 79 is shifted as mentioned above, there is no longer any friction resisting the rotation of the shaft 51 of the feed roller 31 since the wheel 79 is away from the ring members 86, 87 and the rotation of the shaft 51 can be carried out freely and smoothly.

It is necessary to disengage the clutch 39′ between the wheel 61 and the sprocket wheel 35′ on the shaft 62. This can be done by a lever 91 pivoted at 90 and normally urging the clutch 39′ to establish engagement between the wheel 61 and the sprocket wheel 35′ under the action of a spring 92. The lever 91 can be operated to disengage the clutch 39′ when the film S″ is wound back on the feeding roller 31.

As stated above, the wheel 65 on the shaft 49 of the takeup roller 32 is normally in frictional contact with the pressure disc 67 which is fixed against rotation on the shaft 49 when the film S″ is wound on the take up roller 32, but when the film is rewound on the feed roller 31, it is desirable to allow the take up roller 32 to rotate freely without any frictional resistance. This release of the winding roller from the friction resistance is achieved by shifting the pressure disc 67 by the end finger 70 of the lever 72 similar to the corresponding operation on feed roller 31.

It will be seen from the above that, when the film S″ is wound on the take up roller 32 for the reproduction of sound, the clutch 39′ controlling the sprocket wheel 35 is engaged. Wheel 65 is in frictional contact with pressure disc 67 and the clutch 77—78 on the shaft 51 of the feed roller 31 is disengaged while a certain amount of frictional resistance against free rotation of the feed roller is developed. When the film S″ is rewound on the feeding roller 31 from the take up roller 32, the clutch 77—78 on the shaft 51 of the feed roller 31 is engaged and the frictional resistance against the rotation of the shaft 51 of the feed roller is released, while the clutch 39′ on the shaft 62 is disengaged and the frictional engagement between the wheel 65 and the shaft 49 of the take up roller 32 is released.

For conducting the engagement and disengagement as mentioned above simultaneously, according to the present invention, a slidable member 93 is provided which has three inclined surfaces 96, 97, 98 which are in engagement with the lever 83 controlling clutch 78, the lever 72 controlling the frictional contact of the shaft 49, and the lever 91 for the control of the clutch 39′. Said member 93 is normally urged in the direction of the arrow 95′ by spring 101 to establish the engagements required for winding the film S″ on the take up roller 32 for the reproduction of the sound record of the film. Member 93 can be urged in a direction opposite to that of arrow 95 by pressing a button 94 in the direction of arrow 95 to change the engagements of the noted members to that as required for rewinding the film S″ on the feed roller 31 from the take up roller 32. Thus, a single operation of said slidable member 93 is effective to adjust the respective rollers for the desired operation.

Figure 10:
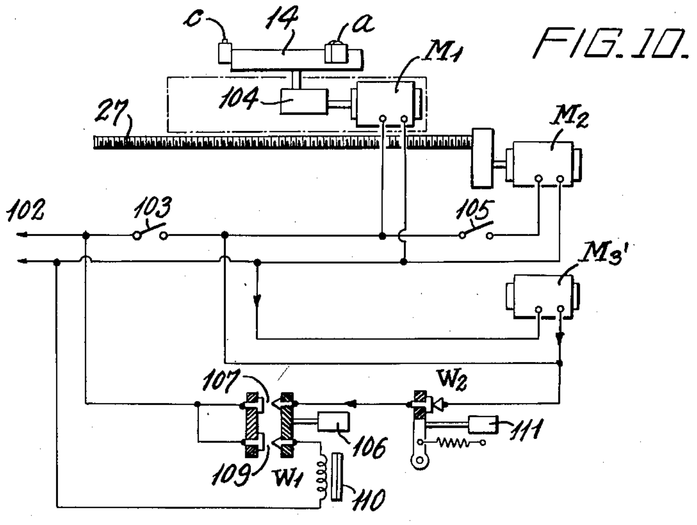
FIG. 10 is a wiring of the apparatus of FIG. 7.

The electric wiring system for the operation of the motors is as follows. FIG. 10 is a diagram illustrating one example of a wiring system. The circuit for the control of the motor $M_1$ for the rotation of the turn table 14 of the magnetic sound record reading machine comprises an electric source 102, a start switch 103. When the switch 103 is closed, the motor $M_1$ is started which rotates the turn table 14 through a reducing gear box 104. $M_2$ is a motor for rotating the helical screw 27 which is adapted to shift a shiftable table (not shown in FIG. 10) on which the turn table 14 is mounted. The motor $M_2$ is operated when a switch 105 is closed.

When the apparatus of the present invention is attached to a magnetic sound record reading machine as illustrated in FIG. 3 and it is desired to use said machine for reproducing an ordinary magnetic sound record sheet of a size of ordinary letter writing paper or the like which can be used only for a record of relatively short time, the ordinary operation can be carried out by using the motors $M_1$ and $M_2$ in usual ways by keeping the magnetic sound record sheet stationary on the machine. On the other hand, when it is desired to use the apparatus for the reproduction of a long film for a long continuous reproduction of sound, the switch 105 is opened to render the motor $M_2$ operative. The device for shifting the turn table 14 in conjunction with its rotation by the motor $M_1$, if any, is cut off, and then the switch 103 is closed to rotate the turn table in a fixed position. Then the motor $M_3'$ of the attached apparatus of the present invention is operated to feed the film of a long continuous record as already explained.

When the recording or reproducing of sound on a long film is completed and it is desired to rewind the film from the take-up roller 32 to the feeding roller 31, the motor $M_3'$ is also used by reversing the direction of the rotation thereof. Switch 103 is of course openend to stop the rotation of the turn table 14 prior to rewinding.

As shown in FIG. 10, the circuit of the motor $M_3'$ has two switches $W_1$ and $W_2$. When the button 106 of the switch $W_1$ is pressed, the contact 107 is closed to reverse the direction of the rotation.

In the apparatus of the invention the operation of the switch $W_1$ is effected by a projection 93′ on the sliding member 93 (FIG. 7) which operates a buton 106 of the switch $W_1$. Thus the change of clutches and the direction of the rotation of the motor $M_3'$ are carried out synchronously by a single operation of the slidable member 93 by means of a button 94.

The sound recording heads *a, b, c* on the turn table 14 are normally in contact with the magnetic sound record coating of the film S″ which is under the pressure plate 52′. In the rewinding of the film, it is necessary to displace these heads from contacting the surface of the film S″. For this purpose, a contact 109 is provided as shown in FIG. 10, which is closed when the button 106 is pressed. The contact energizes an electric magnet 110 which acts to pull down the heads *a, b, c* to a position where they won't contact the sheet. The moving of the heads from the surface of the sheet may be effected by mechanical means coupled to button 106.

In some instances, it may be desirable to carry out rewind of the film slowly to review a particular portion of the film. This is done independently of the rewinding operation by the motor $M_3'$ which would be too quick for this purpose. In such a case, a button 111 of FIG. 7 is operated in lieu of the button 94. Button 111 has an element 112 which moves the slidable member 93 upon movement of button 111 by engaging a projection of the slidable member 93. The pressing of button 111 therefore simultaneously changes the conditions of the clutches required for the rewinding of the film, and opens the switch $W_2$ thereby stopping the rotation of the motor $M_3'$. Under this condition, the feed roller 31 is rotated slowly by a wheel 115 fixed thereon to give a small rotation of the roller in either direction.

The take up roller 32 can be similarly rotated by providing a fixed wheel 116 thereon.

Figure 11:
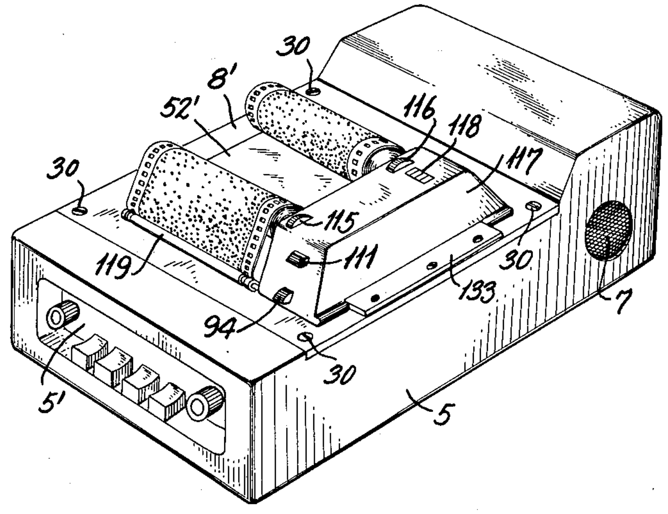
FIG. 11 is a perspective view illustrating the general exterior of a magnetic sound record reading machine provided with the apparatus of FIG. 7.

FIG. 11 is an external view of a magnetic sound record reading machine on which the apparatus A of the present invention as illustrated in FIG. 7 is mounted by means of the panel plate 8′. The push buttons 94, 111 and the wheels 115, 116 projecting from the holes of a cover 117 can be seen. The element indicated by numeral 118 in FIG. 7 and FIG. 11 is a scale indicating the position of the sound track of the sheet.

The elements indicated by 119 in FIG. 9 are pressure rollers to insure stable meshing relation between the film S″ and the sprocket wheels 35, 35′.

Figure 12:
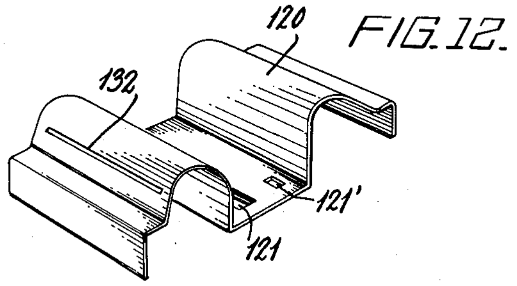
FIG. 12 is a cover used on the apparatus of FIG. 11.

FIG. 12 illustrates a cover 120 for covering the rollers 31, 32 and associated parts.

It is often useful to have indications relating to the contents of a magnetic sound record sheet for identification purposes. Consequently, window openings 121, 121′ of suitable form and size are provided in the cover 120 and the pressure plate 52′ as shown in FIG. 9. Through these windows, the back surface of a magnetic sound record film is accessible for marking thereon a description relating to the content of the film. In FIG. 9, 122 represents a plate which is provided below the window 121 for supporting film S″ to facilitate writing on the film.

It is convenient, if a rod 130 having an elongated slit 131 or a groove is provided as shown in FIG. 7 so that the film may be cut at a desired place by applying a sharp edge of a knife into the groove. The cover 120 illustrated in FIG. 12 has a slit 132 corresponding to the location of groove 131. Through this slit, a sharp edge of a knife may be inserted to cut the film.

When film S″ is wound on the feed roller 31 and the take up roller 32, it will be convenient if there is access between the panel plate 8′ and the rollers. In order to provide such access the roller mechanism is constructed as a sub-assembly which is connected on the panel plate 8′ by a hinge 133 as illustrated in FIG. 11 so that the entire sub-assembly is pivotable about the hinge.

What I claim is:

1. An apparatus adapted to be attached on a magnetic sound record reading machine comprising a turn table, a plurality of sound recording and reproducing heads adapted for revolving around the center of the turn table, said turn table being shiftable in a linear direction, a panel plate provided with a window adjacent which a magnetic sound record sheet is placed to expose a magnetic film to the heads for selectively effecting recording and reproducing by the heads, said apparatus being adapted for making the machine suitable for recording and reproducing sound for an extended period, said apparatus comprising: a panel plate adapted to replace the panel plate of the machine, a feed roller, a sprocket wheel on the panel plate and operatively associated with said roller, a take up roller, a sprocket wheel on the panel plate and operatively associated with said take up roller, a motor mounted on the panel plate, a transmission system and clutch device for driving the feed roller and, in turn, being driven by the motor, a clutch device for driving the first said sprocket wheel and, in turn, being driven by the motor, a device for driving the take up roller by rotating the second said sprocket wheel, a lever controlling the clutch device associated with the feed roller, a lever controlling the clutch device associated with the sprocket wheel of said take up roller, a slidable member engaged with said levers, a spring urging said member to operate the levers to establish the engagement of the clutch for driving the sprocket wheel associated with the take up roller and the disengagement of the clutch for driving the take up roller, a button operatively associated with and effective to disengage the clutch for driving the sprocket wheel associated with the take up roller and engage the clutch for driving the feed roller, and a switch operated by said button for reversing the direction of rotation of the motor, whereby a film for continuous sound recording and reproducing can be wound from the feed roller to the take up roller over the turn table which is rotated in a fixed position, the film passing in operative relation with the heads to perform sound recording and reproducing, and whereby, with the recording or reproducing completed, the film can be rewound on the feed roller from the take up roller by single operation of the slidable member.

2. An apparatus according to claim 1, comprising a shaft supporting a feed roller and wherein the clutch device for driving the feed roller comprises first and second members adapted to be engaged in driving relation, one of said members being fixed to the shaft of the feed roller to rotate therewith and being slidable axially on said shaft, the other member being mounted freely upon the shaft.

3. An apparatus according to claim 2, comprising a ring fixed on the panel plate, a disc member of frictional material adjacent said ring, said one member of the clutch device being adapted to urge the disc member against the ring to produce frictional resistance against the rotation of the feed roller.

4. An apparatus according to claim 1, wherein the slidable member is a bar provided with a plurality of ramps and each of the ramps is engaged respectively with one of the levers for controlling the clutch devices for driving the feed roller and the take up roller selectively, and wherein the slidable member includes an element which operates the switch which controls the direction of the rotation of the motor, whereby a film mounted around the feed roller and the take up roller is wound selectively on the take up roller from the feed roller and on the feed roller from the take up roller by the operation of the slidable member.

5. The apparatus according to claim 4, including a further element, and a switch operated by the further element in response to the slidable member to stop the rotation of the motor when the clutch devices are operated for winding on the feed roller whereby the winding of the film on the feed roller may be carried out by hand to place the film in finely adjusted position.

References Cited in the file of this patent

UNITED STATES PATENTS

| | | |
|---|---|---|
| 2,245,286 | Marzocchi | June 10, 1941 |
| 2,647,168 | Rivas | July 28, 1953 |
| 2,750,449 | Thompson et al. | June 12, 1956 |
| 2,858,996 | Switzer | Nov. 4, 1958 |
| 2,868,470 | Selsted | Jan. 13, 1959 |

FOREIGN PATENTS

| | | |
|---|---|---|
| 345,356 | Italy | Dec. 29, 1936 |